Figure 1:
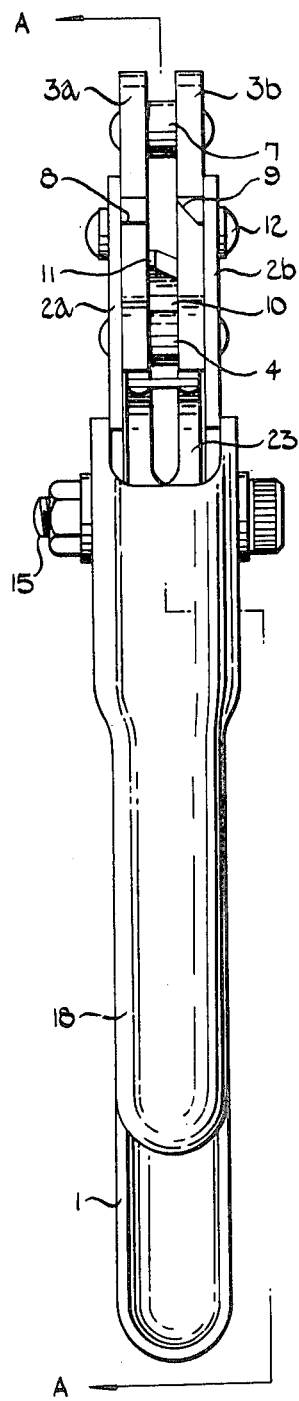

United States Patent [19]

Parramore

[11] 4,221,048
[45] Sep. 9, 1980

[54] HAND-GRIP CUTTING TOOLS

[75] Inventor: Thomas S. Parramore, Bournemouth, Dorest, England

[73] Assignee: National Research Development Corporation, London, England

[21] Appl. No.: 901,206

[22] Filed: Apr. 28, 1978

[51] Int. Cl.³ .......................................... B26B 17/02
[52] U.S. Cl. ...................................... 30/135; 30/189; 30/250; 72/410; 81/314
[58] Field of Search ................ 30/189, 193, 245, 250, 30/258, 135; 140/93 A, 93.2, 93.4; 81/314; 72/410

[56] References Cited

U.S. PATENT DOCUMENTS

| 1,162,796 | 12/1915 | Mattson | 30/250 |
|---|---|---|---|
| 1,174,161 | 7/1916 | Johanson | 30/250 |
| 1,284,688 | 11/1918 | Hultman | 30/250 |
| 1,317,758 | 10/1919 | Dicop | 30/250 |
| 1,321,208 | 11/1919 | Hinnershitz | 72/410 |
| 1,858,418 | 5/1932 | Rowley | 72/410 |
| 2,616,316 | 11/1952 | Dupre | 72/410 |
| 2,861,490 | 11/1958 | Rozmus | 81/314 X |
| 2,874,465 | 2/1959 | Sillak | 30/258 X |
| 2,931,100 | 4/1960 | Wertepny | 30/258 |
| 3,101,017 | 8/1963 | Malkin et al. | 81/314 X |
| 3,169,307 | 2/1965 | Langwell | 81/314 X |
| 3,210,844 | 10/1965 | Tontscheff | 30/250 |

Primary Examiner—W. Donald Bray
Attorney, Agent, or Firm—Cushman, Darby & Cushman

[57] ABSTRACT

A hand-grip tool for cutting, crimping, swaging or gripping is disclosed, having a multi-stroke action provided by a ratchet and pawl operating arrangement whereby sufficient mechanical advantage to permit one-handed performance of heavy duty tasks can be achieved.

2 Claims, 6 Drawing Figures

HAND-GRIP CUTTING TOOLS

This invention relates to hand-grip tools. In particular, but not exclusively, it relates to tools suitable for one-handed performance of heavy duty cutting, crimping, swaging and gripping tasks.

A wide variety of hand-grip tools having single-stroke operation are known, i.e. having co-operating work members which are moved from fully open to fully closed during a single stroke of the handles. However, when such single-stroke tools are intended for heavy duty tasks the necessary mechanical advantage can only be obtained by extending the handles to increase the leverage effect. Such long handled tools, bolt croppers for example, have a handle span which is too great for a man's single hand, thus necessitating the use of both hands with the attendant disadvantage that the second hand is no longer available to perform other functions often related to the task. Furthermore the large operating arc of such long handled tools makes them unsuitable for use in confined spaces.

It is an object of the present invention to provide a tool suitable for cutting, crimping, swaging or gripping which can be operated with one hand, having a multiple-stroke action to provide sufficient mechanical advantage for the performance of heavy duty tasks.

According to the present invention, a hand-grip tool includes two coactive work members, a cam means arranged to urge a first one of the work members towards the second, a ratchet drive means arranged to rotate the cam means, and an operating lever arranged to rotate the ratchet drive means, all being operatively mounted upon a common support member.

The first and second work members may comprise a pivotable cutting blade and a fixed anvil respectively, which anvil may consist of a single plate having a cutting edge arranged to coact in shearing action with a cutting edge of the cutting blade or preferably may consist of a pair of parallel plates arranged on one either side of the pivoted cutting blade, one plate providing a cutting edge coactable with the cutting edge of the cutting blade and the other providing anti-twist support for the blade as well as serving to locate securely the object to be cut.

Alternatively, the first and second work members may comprise crimping, swaging or gripping anvils.

The ratchet drive means may comprise a toothed wheel axially coupled with the cam means, rotatably mounted on the support member and driveable by a drive pawl operatively connected to the operating lever, which lever may be pivotally attached to the support member. The toothed wheel may be additionally engaged by a non-return mechanism secured to the second work member or to the support member. In operation, full closure of the operating lever with the support member advances the toothed wheel by one tooth thereby rotating the cam means through an equivalent angle and closing the first work member towards the second work member by an amount dependent upon the contours of the cam means. The non-return mechanism simultaneously engages a next succeeding tooth of the wheel thereby retaining the wheel in its advanced position and permitting the drive pawl to be withdrawn from the wheel to re-engage a next succeeding tooth when the operating lever is returned to its fully open position in readiness for the next stroke. The first work member is thus progressively advanced towards the second work member by successive closures of the operating lever with the support member.

The toothed wheel may have as many teeth as are necessary to secure the mechanical advantage required for a particular task. The greater the number of teeth, the greater will be the mechanical advantage and the greater will be the number of operating strokes required to achieve full closure of the two work members.

Figure 7:
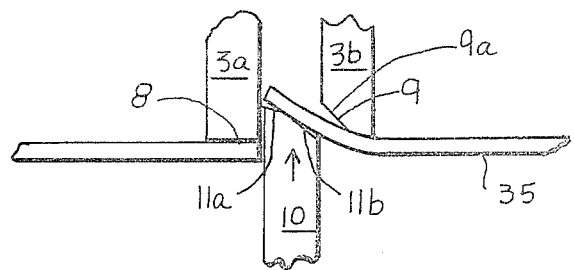
Figure 2:
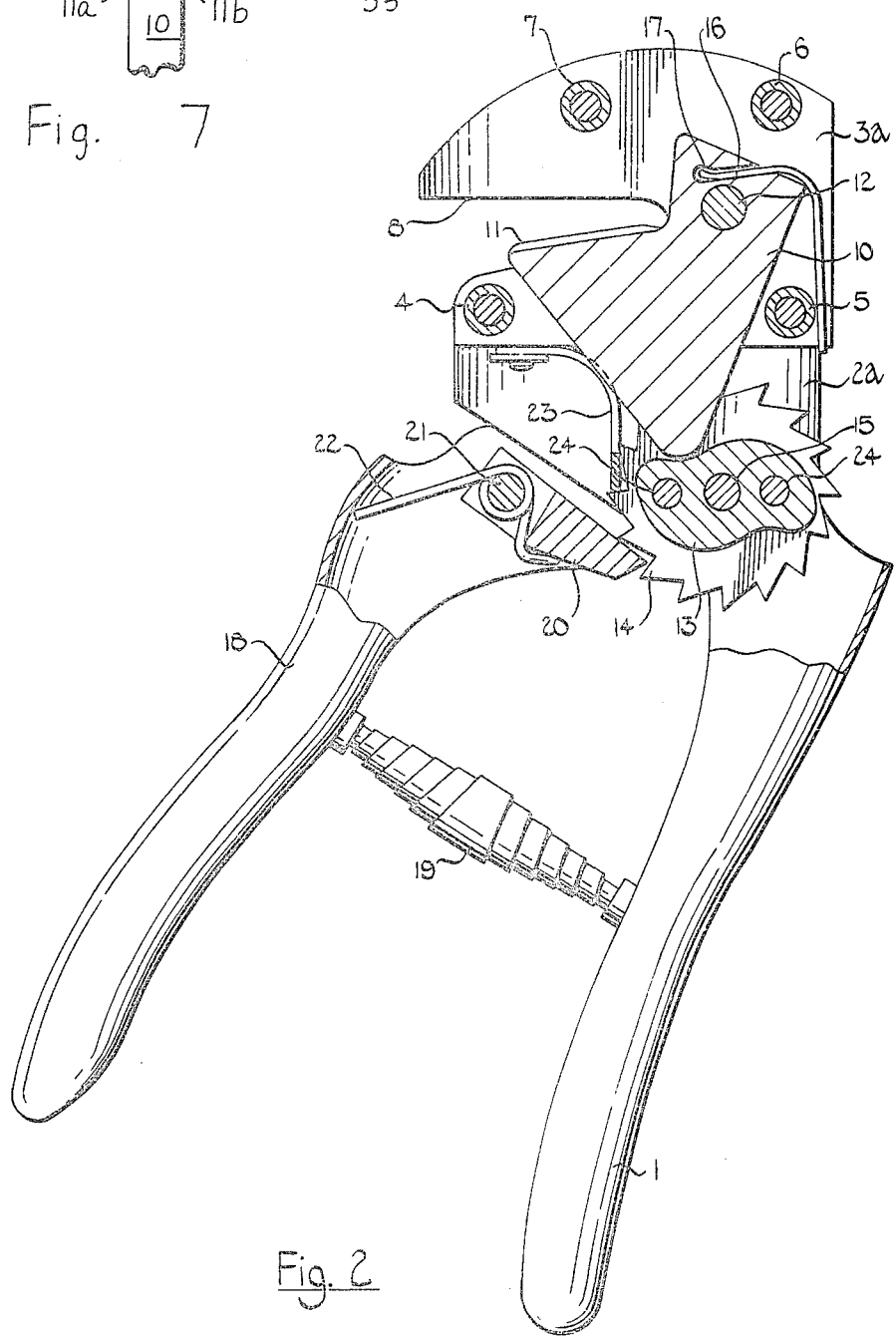
Figures 3, 4:
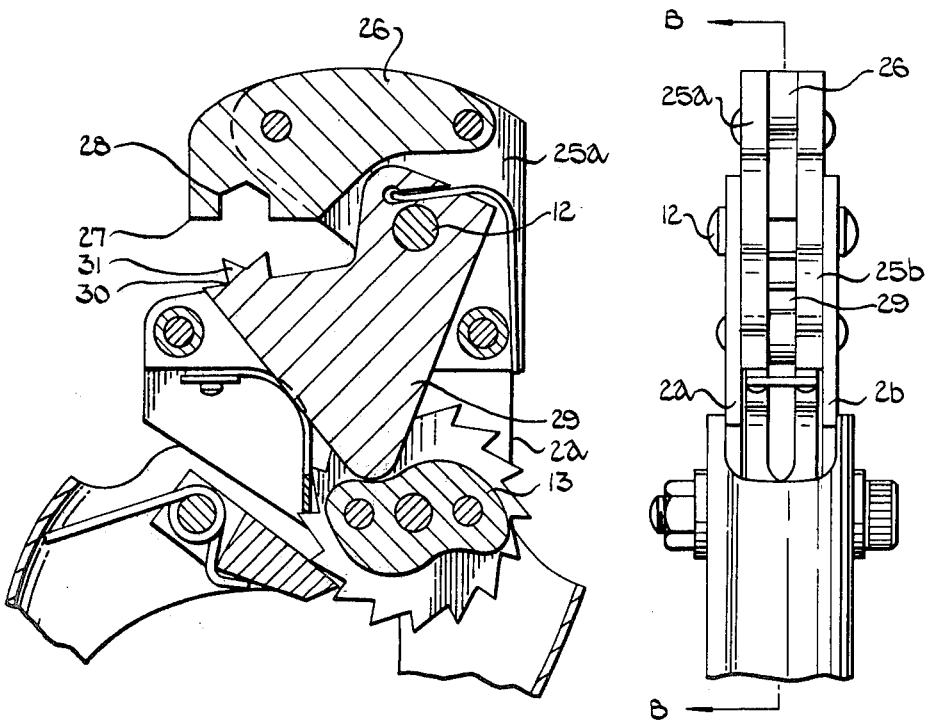
Figures 5, 6:
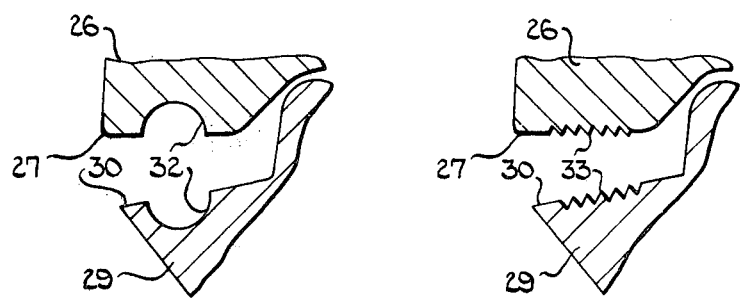

Embodiments of the invention will now be described by way of example with reference to the accompanying drawings of which:

FIG. 1 is an front view of a multiple-stroke hand-grip tool fitted with a cutting head, FIG. 2 is a side elevation of the same tool and cutting head, part-sectioned on the line A—A of FIG. 1, FIG. 3 is an edge view of part of a similar multiple-stroke hand-grip tool fitted with a crimping head, FIG. 4 is a side elevation of the same crimping head, sectioned on the line B—B of FIG. 3, FIGS. 5 and 6 are part side elevations of variants of the work members of FIG. 4, adapted for swaging and gripping respectively, and FIG. 7 is a partial front view of the anvils and working member cutting a piece of tape.

The support member of the cutting tool illustrated in FIGS. 1 and 2 is constituted by a support handle 1 which is bifurcated at one end into twin, parallel support checks 2a and 2b. Two anvil plates 3a and 3b comprising the aforesaid second work member, are rigidly mounted between the support cheeks 2a and 2b and held in parallel separation by four cylindrical spacers 4, 5, 6 and 7. The anvil plates 3a and 3b are respectively provided with a cutting edge 8 and a locating edge 9, and a coacting blade 10 comprising the aforesaid first work member and having a cutting edge 11 is rotatably attached between the two anvil plates at a pivot 12, the blade 10 being a sliding fit between the two plates.

The cutting edge 11 of the blade 10 can be advanced and retracted with respect to the cutting edge 8 of the anvil plate 3a, in a direction which is transverse to the inclination of these edges as is described below, with respect to FIG. 7, by the rotation of a cam 13 interjacent and angularly interlocked with two ratchet wheels 14, all being rotatably mounted between the twin support cheeks 2 upon a common axial shaft 15, which shaft protrudes normally through and is supported by the support cheeks 2a and 2b. Cutting edge 8 is angled transversely normal to the direction of closure of the cutting edge 11. The blade 10 is held against the cam 13 by the pressure of a leaf spring 16 captively located at one of its ends within a slot 17 of the blade 10 and slideable at the other end against the spacer 5.

An operating handle 18, comprising the operating lever, is rotatably attached at one of its ends to the shaft 15 and angularly located with respect to the support handle 1 by means of a compression spring 19.

A pawl 20, engageable with the two ratchet wheels 14, is rotatably attached to the operating handle 18 at a pivot 21 and maintained in contact with the ratchet wheel by a torsion spring 22 axially located at the pivot 21 and angularly constrained by the operating handle 18.

In operation, the operating handle 18 is closed towards the support handle 1 thereby driving the pawl 20 against the ratchet wheels 14 to rotate them and to turn the interlocked cam 13 against the blade 10, thus causing the cutting edge 11 to be rotated towards the cutting edge 8 of the anvil plate 3a. A bifurcated leave spring 23 is attached at its divided end to the anvil plates 3a and 3b, the other end coacting with the ratchet wheels 14 to maintain them in their advanced position at the end of each complete stroke of the operating handle, thus providing a non-return mechanism which permits the handles to be reopened for the next stroke without loss of blade closure already gained.

The cam 13 of this example is shaped to provide full closure of the cutting edge 11 with the cutting edge 8 at each 180° of revolution, whereupon the next turn of the cam resulting from a further operating stroke permits the blade 10 to return to the fully retracted position. It will be apparent that a variety of other cam shapes may be employed giving full closure at various sub-divisions or multiples of a complete revolution, and providing variously graded amounts of blade closure for successive operating strokes.

Interchangeable ratchet wheels 14 having differing numbers of teeth can also be provided, any of which may be fitted to give the tool a range of mechanical advantage suitable to meet various cutting requirements. The wheels are changed by axially withdrawing the shaft 15 from the tool and reassembling the cam 13 with a selected ratchet wheel pair, angular interlock between the cam and the wheels being ensured by the provision of locating pins 24. Obviously the cam 13 may also be replaced by differently contoured cams in like manner. Alternatively, complete sub-assemblies of ratchet wheel pairs and cam may be provided, the three components being permanently interconnected, by rivets for example.

The edges 8 and 9 of the anvil plates 3, together with the cutting edge 11 of the blade 10 are shaped in this example to permit cutting of both steel wire and steel tape, a semi-circular notch (not shown) being provided in the anvil plate 3b adjacent the pivot end of the locating edge 9 to prevent cylindrical objects from sliding out from the cutting edges. Referring to FIG. 7 when tape 35 is being cut it is positioned against the edges 8 and 9 of the anvil plates 3a and 3b respectively, an angled lead 9a of the locating edge 9 being provided to prevent twisting and wedging of the tape 35. The cutting edge 11 of the blade 10 is chamfered back transversely to the direction of closure at two distinct angles, the first angled portion 11a providing the cutting angle and the second angled portion 11b providing a tape clearance slot with respect to the angled shoulder of the locating edge 9.

A second embodiment of the invention, illustrated in FIGS. 3 and 4, is arranged for crimping and differs from the first embodiment only in its two work members, which comprise crimping anvils instead of cutting blades. Two anvil holders 25a and 25b are rigidly mounted between the support cheeks 2a and 2b and support between themselves a fixed first anvil 26 and a second anvil 29 which is rotatable about the pivot 12. The two anvils 26 and 29 have coacting faces 27 and 30, respectively provided with a female crimping die 28 and a male crimping die 31.

Operation of the rotatable anvil 29 is as described for the rotatable blade 10 of the first embodiment, the cam 13 being so disposed that once the anvils have reached full closure, the anvil 29 is retracted by the next following operating stroke. Because the ratchet drive operates in one direction only, the dies cannot be re-opened to permit removal of a workpiece before full closure has been achieved, with the advantage that the tool cannot be defeated by an operator, i.e. the pre-selected crimping pressure must always be fully applied.

Variants of the two anvils 26 and 29 adapted for swaging and for gripping are illustrated in FIGS. 5 and 6 respectively, the coacting faces 27 and 30 of the anvils being provided with swages 32 or serrations 33.

It will be apparent to those skilled in the art that many other arrangements according to the present invention are possible. For example, the operative components may be variously disposed upon a suitable support member so as to permit operation at any convenient work angle, and the work members may be of various configurations adapted to suit specific tasks.

The fixed anvil of the crimping and swaging heads may be additionally provided with position adjustment means to permit variation of the pressure achievable and also to allow for wear. The movable anvil may also be arranged to slide instead of rotating towards the fixed anvil under the action of the cam.

Further, support plates or jaws may be fitted for locating or holding ancillary items such as ferrules, terminals, sleeving etc.

I claim:

1. A hand grip tool including:
   a support member having a support handle;
   a first and a second anvil plate both mounted in plane parallel relationship upon the support member, the first anvil plate having a first cutting edge and the second anvil plate having a locating edge spaced from said first cutting edge;
   a work member pivotally connected to and slidable between said first and second anvil plates, said work member having a second cutting edge engagable with said first cutting edge to cut an object, said working member having non-cutting means co-operable with said locating edge to locate and secure said object while said object is being cut by said first and second cutting edges;
   a cam pivotally connected to said support member and abutting said work member;
   a biasing means operative between said work member and said support member for holding the work member against the cam;
   a ratchet wheel coupled with said cam;
   an operating handle pivotally connected to said support member and biased away from said support handle;
   a drive pawl pivotally connected to said operating handle and biased to engage with said ratchet wheel, thereby to rotate the ratchet wheel and said cam when the operating handle is squeezed towards said support handle; and
   a non-return mechanism operative between said support member and said ratchet wheel so as to prevent rotation of the ratchet wheel when said operating handle is released.

2. A hand grip tool as claimed in claim 1, wherein said first cutting edge is transversely normal to the direction of closure with the second cutting edge; and further wherein
   said cutting edge is transversely inclined at a first distinct angle to said direction of closure so as to engage with said first cutting edge and said non-cutting means comprising a third edge transversely inclined at a second angle distinct from said first angle so as to close with said locating edge, said second cutting edge engaging with said first cutting edge before said third edge closes with said locating edge when said first and second edges are brought into engagement; and said locating edge has an angled shoulder transversely inclined to said direction and set back from said first cutting edge in said direction, said shoulder being co-operable with said third edge so as to provide an obliquely angled clearance slot for locating and supporting the object being cut when said first and second cutting edges are brought into engagement.

* * * * *

UNITED STATES PATENT AND TRADEMARK OFFICE
CERTIFICATE OF CORRECTION

PATENT NO. : 4,221,048
DATED : September 9, 1980
INVENTOR(S) : Thomas S. Parramore It is certified that error appears in the above—identified patent and that said Letters Patent is hereby corrected as shown below:

On the title page the following should be added:

-- [30] Foreign Application Priority Data

May 6, 1977   United Kingdom   19165/77 --.

Signed and Sealed this

Sixteenth Day of December 1980

[SEAL]

Attest:

SIDNEY A. DIAMOND

Attesting Officer  Commissioner of Patents and Trademarks